Patented Nov. 7, 1922.

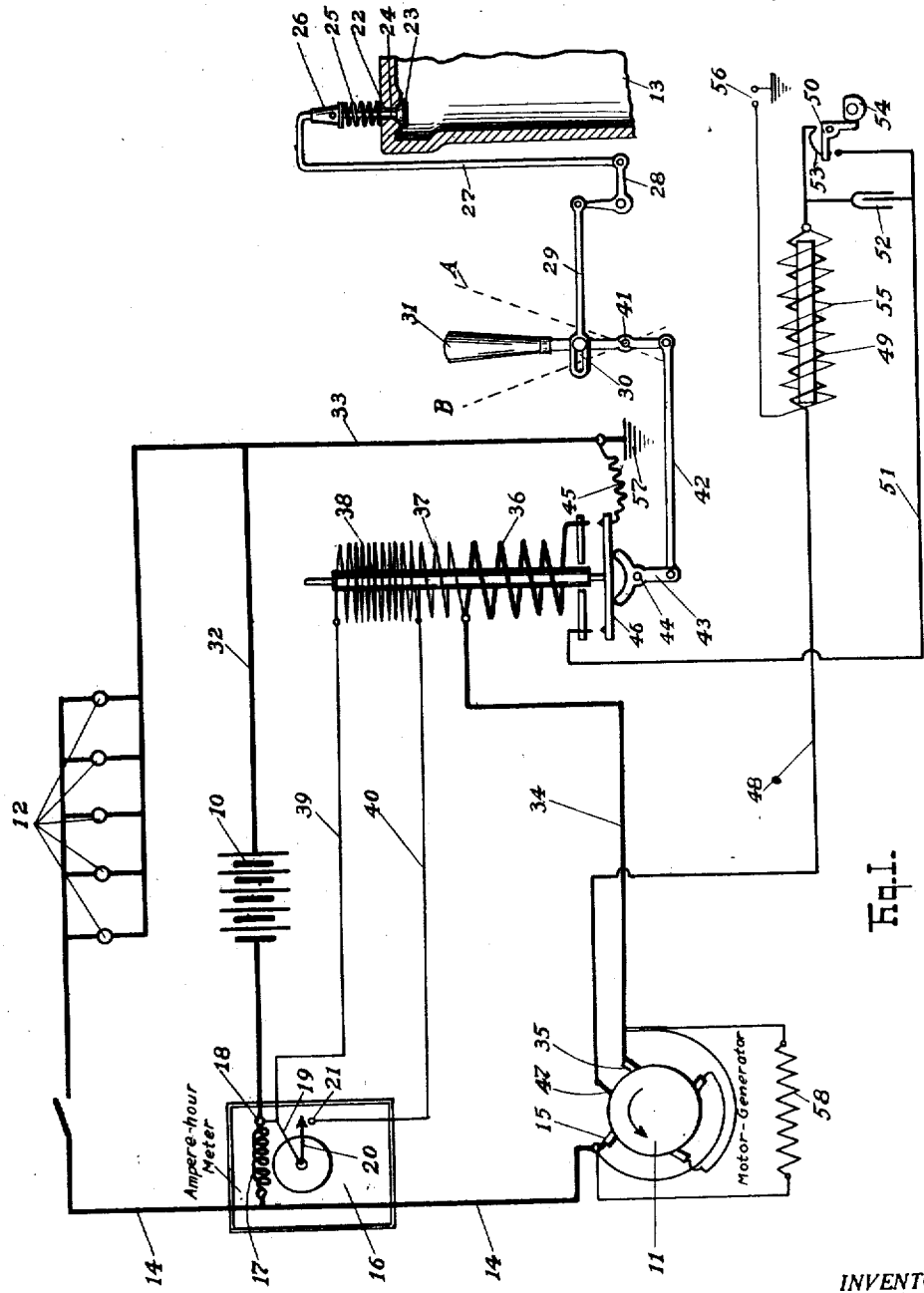

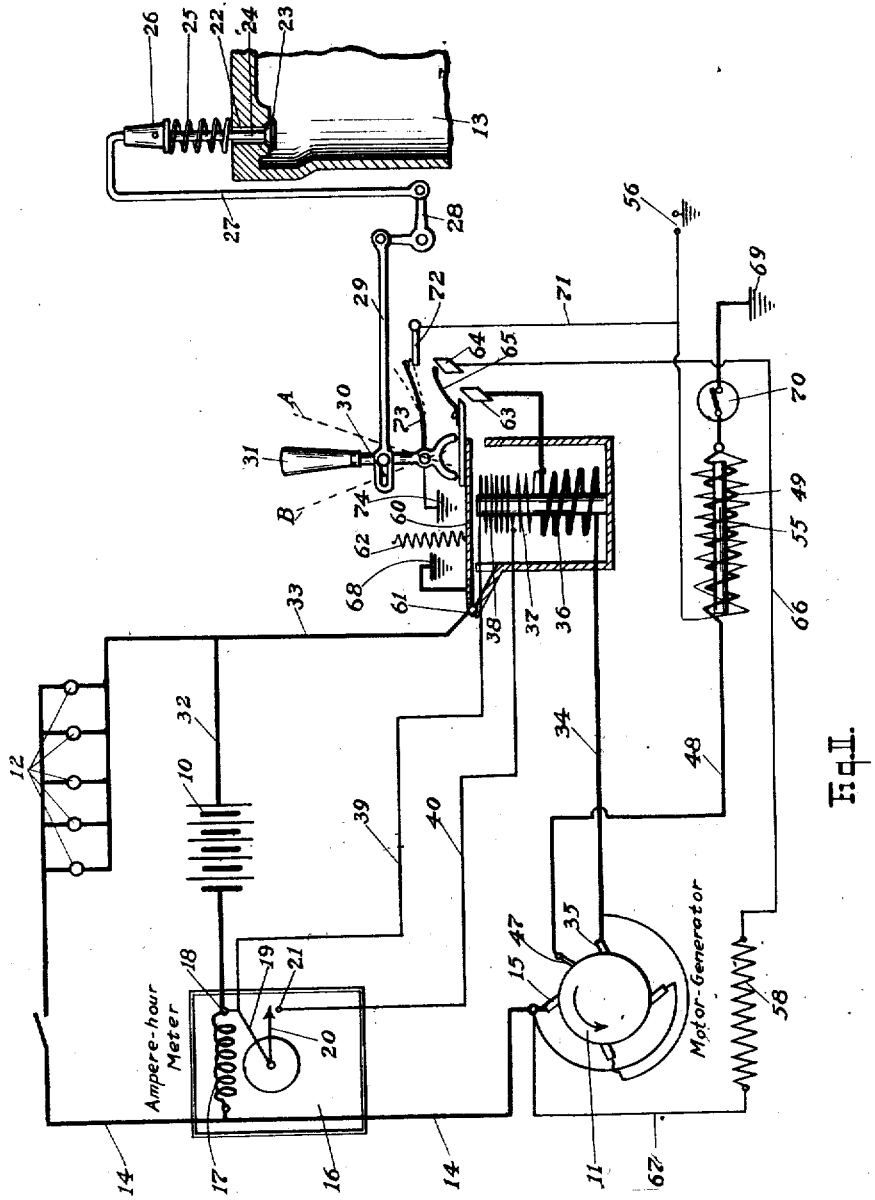

1,434,988

UNITED STATES PATENT OFFICE.

CARL P. BROCKWAY, OF TOLEDO, OHIO, ASSIGNOR TO INDUSTRIAL RESEARCH CORPORATION, OF TOLEDO, OHIO, A CORPORATION OF OHIO.

ELECTRIC GENERATING SYSTEM.

Application filed April 8, 1919. Serial No. 288,570.

*To all whom it may concern:*

Be it known that I, CARL P. BROCKWAY, a citizen of the United States, residing at Toledo, in the county of Lucas and State of Ohio, have invented certain new and useful Improvements in Electric Generating Systems, of which I declare the following to be a full, clear, and exact description.

This invention relates to improvements in electrical systems for charging and discharging storage batteries, in which a gas engine is employed as a source of power, and in which a motor dynamo is operatively connected with the gas engine for starting the latter and for charging the battery, and, if desired, for furnishing current for the ignition system of the engine.

One object of the invention is the provision of means for diminishing the load upon the dynamo electric machine while motorizing by relieving the compression in the engine cylinder or cylinders.

Another object of the invention is the provision of means for manually closing the circuit between the motor-dynamo and storage battery, and for automatically opening that circuit after the battery has reached a predetermined state of charge.

Another object of the invention is the provision of a common controlling means for relieving compression in the engine cylinder, and for closing the circuit between the motor dynamo and storage battery.

Another object of the invention is the provision of means for closing and opening the primary ignition circuit at the same time that the circuit between the storage battery and motor dynamo is closed and opened.

Another object is the provision of means for grounding the ignition circuit while the compression relieving means is in operation.

A further object is the closing of the field circuit of the motor dynamo before the circuit through the armature thereof is closed.

Still another object is a combination with means for relieving compression in the engine cylinder, of means for producing a relatively strong current in the ignition circuit, prior to the operation of the dynamo-electric machine as a generator.

Other objects, and objects relating to details of construction and economies of manufacture, will appear as I proceed with the description of that embodiment of the invention which, for the purposes of the present application, I have illustrated in the accompanying drawings, in which, Figure I is a diagram of apparatus and electrical connections embodying my invention.

Figure II is a similar diagram showing certain modifications.

Similar reference characters refer to similar parts in each of the views.

In the drawings, 10 indicates a storage battery, which is floated across the line between the dynamo electric machine 11 and a load, indicated as a bank of lamps 12. Although not shown in the drawings, the dynamo electric machine 11 is operatively connected by any suitable driving means with a gas engine, a fragment of the cylinder of which is indicated at 13.

From the lamps 12 a circuit wire 14 leads to one of the main brushes 15 of the motor-dynamo. Between the battery 10 and the circuit wire 14 is located a reversible, integrating, current meter 16, preferably an ampere-hour meter, the internal circuit of the meter being diagrammatically indicated at 17. From one terminal 18 of the meter a conductor 19 leads to the dial hand 20, which is an electric conductor and is adapted to make an electric connection with a contact point 21 positioned on the face of the dial at the point indicating full charge of the battery.

In order to lessen the load put upon the motor-dynamo while starting the engine, I provide mechanism for relieving compression in the engine until it has attained a desired speed of rotation. For this purpose, the engine cylinder 13 has a port 22 therein which is normally closed by a downwardly opening valve 23 mounted upon the end of a valve stem 24. A coil spring 25, bearing at its respective ends against the engine cylinder and against a stop 26 secured to the valve stem, tends to hold the valve in closed position. The valve stem is but a small part of a long angular rod 27, which extends downwardly alongside the engine cylinder, and is pivoted at its lower extremity to one arm of a bell crank lever 28, the other arm of which is pivoted to a link 29 having a loose pin and slot connection 30 with a control lever 31.

As heretofore stated, the circuit wire 14 is connected with one of the main brushes 15 of the motor-dynamo. The other side of the circuit between the battery and motor-dynamo is connected by means of wires 32, 33 and 34 with another main brush 35 of the motor-dynamo. Between the circuit wires 33 and 34 is a switch arranged to be maintained in closed position by an electro-magnet, one coil 36 of which is in series with the wires 33, 34. Two other coils 37 and 38, which are wound in opposite directions, are arranged in series with each other and normally are included in a shunt circuit, which is connected to the series coil 36 at one end and through a circuit wire 39 with the meter contact 18 at the other end.

During charging of the battery, the magnetic effects of the coils 36 and 38 are cumulative and, even though opposed by the coil 37, are sufficient to maintain the magnet armature in attracted position, after it has been manually shifted to that position. At the junction of the coils 37 and 38 a wire 40 leads to the contact 21 on the meter dial. When the battery is completely charged, the meter hand 20 makes electric connection with the contact 21 and sets up a circuit through the wire 40, short circuiting the wire 39 and the coil 38. This eliminates the magnetic effect of the coil 38. Furthermore, because of the fact that the resistance through the wire 40 and the coil 37 is less than the resistance through wire 39 and the two coils 38 and 37, the current traversing wire 40 and coil 37 is greater than that which normally traverses coil 37. Hence, when the circuit is completed through wire 40, coil 36 not only loses the assistance of coil 38, but also the opposing effect of coil 37 is increased, and the parts are so designed that, under these latter conditions, the strength of the magnet will no longer be sufficient to hold the armature in its attracted position.

As some of the details of the remaining features of the invention differ slightly in the two modifications illustrated, these features will be taken up separately in the description of the two figures of the drawings.

In Fig. I, the control lever 31 is mounted to swing upon the pivot 41. A link 42 is pivoted at one end to the bottom of the control lever and at the other to the bottom of a Y-shaped lever 43, which swings upon a pivot 44. The circuit wire 33 is connected by a flexible electric conductor 45 with an armature 46, which constitutes a switch, through which electrical connection is made between the coil 36 and the conductor 45 when the armature 46 is raised.

Ignition current for the gas engine, to which the dynamo-electric machine is operatively connected, is taken off an auxiliary or "third" brush 47 of the motor-dynamo 11. At starting the current passes from the battery through wires 32, 33, 45, armature 46, wire 51, timer 50, spring 53, coil 49 and wire 48 to third brush 47, through the rotating armature to brush 15 and thence through wire 14, meter circuit wires 17 and back to the battery. When the machine 11 is generating, the current follows the same circuit in the reverse direction. A condenser 52 is connected across this circuit to reduce sparking, as will be well understood by those skilled in the art. In the timer illustrated, spring 53 for pressing the contact lever against the actuating cam 54 is a part of the primary circuit. The secondary winding 55 of the ignition coil is connected on one side to the spark plug diagrammatically indicated at 56, and thence to the ground, and on the other side to spring 53, timer lever 50, circuit wire 51, armature 46 and flexible conductor 45 to ground at 57. The field circuit 58 of the motor generator is shunted across the main brushes 15 and 35.

The operation of this modification of the invention is as follows: It being assumed that the hand 20 of the meter 16 shows that the battery is nearly discharged, and the operator wishing to recharge it, the control lever 31 is thrown to the right to the dotted line position marked A. This accomplishes the opening of relief valve 23 through the mechanism already described. It also swings the lower end of the Y lever 43 to the left, thereby causing one prong of the latter lever to elevate the armature 46, until it makes contact with the adjacent end of the wire 51 and the coil 36, thereby completing a circuit from the battery 10 through wires 32, 33, 45, 36, and 34 to the motor-dynamo, from the latter through wire 14 to the meter 16, through the internal circuit 17 thereof, and back to the battery. At this time the magnetic effects of coils 36 and 37 are cumulative and are opposed by the magnetic effect of coil 38. Because of the fact that there is a heavy current, possibly 150 amperes, passing through series coil 36, the magnetic effect of this coil greatly over-balances the algebraic sum of the magnetic effects of coils 37 and 38, and consequently the armature is strongly held in place. At the same time, both the primary and secondary ignition circuits are cut in, the primary current passing from the battery 10 through wires 32, 33, 45, armature 46, wire 51, timer 50, spring 53, coil 49, wire 48, third brush 47, through the rotating armature to brush 15, and thence through wire 14, meter circuit wires 17, and back to the battery, while the secondary current induced in the coil 55 flows through the gap of the spark plug 56 to the ground and thence from the ground at 57 through wire 45, armature 46 and wire 51 back to coil 55.

When the machine 11, working as a motor, has overcome the inertia of the engine running under substantially no compression, the operator throws the control lever 31 as far as possible in the opposite direction to position indicated by dotted line B in the drawing. The armature remains in its attracted position however. By this movement of the lever 31 the valve 23 is permitted to be closed by the spring 25, the loose connection 30 permitting the control lever to move to the left without interference from the compression relieving mechanism. If the engine conditions are right the engine will then begin to fire and will rotate the machine 11 as a generator, sending current through the meter 16 into the battery 10. If some of the lamps 12 are burning, the current for this purpose will also be drawn from the generator and will pass directly to the lamps without going through the meter 16.

When sufficient time has been given to start the engine, the operator moves the control lever 31 into neutral position, which is the position shown in full lines in the drawing. It will be observed that in this position the compression relieving mechanism is not affected. In case the engine is then running under its own power, causing the machine 11 to generate current, the direction of current through the coil 36 is reversed, while that through coils 37 and 38 remains as before. Now the magnetic effects of coils 36 and 38 are opposed only by the weak coil 37. Hence, the armature is held in attracted position. So long as all three of the coils are energized therefore, the armature 46 will retain the respective circuits closed and the battery will continue to be charged.

As the charging operation continues, the meter hand 20 moves from its initial position towards its full position, and when it reaches the contact 21, which is at the point indicating full charge of the battery, a shunt circuit is completed from terminal 18 through wire 19, meter hand 20, contact 21 and wire 40 to the junction of the two coils 37 and 38, which short circuits coil 38, and also provides a path of less resistance for the current through coil 37. As a consequence, the coil 36 no longer has the assistance of coil 38, and the counteracting effect of coil 37 is heightened somewhat. Because of these combined effects the electro-magnet is no longer strong enough to hold the armature 46 in elevated position and it falls, breaking the battery dynamo circuit and the ignition circuit, thus stopping the engine.

If during the starting operation something should prevent the starting of the engine, as for instance, lack of fuel, the battery would not continue to discharge through the motor indefinitely, subsequent to the removal of the switch to neutral position. After the motor has acquired its normal running speed, its load is merely that required to keep the engine rotating, for which load it takes a comparatively small current, say 30 amperes, whereas at the beginning of the starting operation, as before mentioned, it may have required a current as high as 150 amperes. The coils of the magnet are so designed that at some current value greater than the minimum of 30 amperes, the lessened magnetic effect of the coil 36, plus the weak effect of the coil 37, will be insufficient to overcome the counteracting effect of coil 38 and the weight of the magnet armature 46, whereupon the armature falls and the circuits are broken, thus terminating the discharge of the battery through the motor.

Now, taking up the modification of the invention illustrated in Fig. II, the armature 60 of the electro-magnet is hinged at 61, and has connected thereto a spring 62 which tends to hold the armature away from the magnet. In this figure a contact 63 electrically connected with the magnet coil 36, is arranged to be engaged by the armature, thus completing the circuit between the battery and the motor-dynamo through wires 32 and 33, armature 60, contact 63, coil 36, wire 34, brushes 35 to 15 of the motor-dynamo, wire 14 and circuit 17 of the meter 16, back to the battery. A second contact 64 is adapted to be engaged by a spring conductor 65, attached to the armature, to complete the circuit from battery 10 through wires 32, 33, armature 60, contacts 64, 65 and wire 66, through motor generator field 58, wires 67 and 14, meter circuit 17, back to the battery. When the armature is depressed it completes this latter circuit through the field winding prior to the completion of the circuit through the armature of the motor-dynamo.

In Fig. II the primary ignition circuit runs from the battery 10 through wires 32 and 33 to the armature 60, thence to the ground at 68, and from the ground at 69 through timer 70 to the primary winding 49 of the ignition coil, through wire 48 to the third brush 47 of the motor-dynamo, through the armature of the latter to brush 15 and thence through wire 14 and meter circuit 17 back to the battery. Current induced in the secondary winding 55 of the ignition coil normally passes through the spark plug 56 to ground and from ground at 69 back to the coil. This circuit however, is arranged to be grounded when the compression relieving mechanism is in operation, the spark plug being short circuited through wire 71, contact 72, spring contact 73 carried by the control lever 31, and to ground at 74.

In general respects, the operation of this modification of the invention is similar to that of Fig. I. When it is desired to begin charging the battery, the operator shifts control lever 31 to position "A," grounding the secondary of the ignition through contacts 72 and 73, completing the shunt field circuit through contacts 64 and 65, and thereafter completing the dynamo electric machine armature circuit and the engine ignition circuit through contact 63. At the same time, the compression relieving mechanism is operated in the same manner as in the other modification. Now, when the engine gathers sufficient speed, the control lever 31 is thrown to position "B," separating the contacts 72 and 73, thus eliminating the short circuit in the secondary of the ignition. This movement of the lever also permits valve 23 to be closed by the spring 25. The engine now begins to operate under its own power, and the machine 11 begins to generate current for charging the battery through the meter 16. The operator then moves the control lever 31 to neutral position, shown in the drawing, but the armature 60 remains in its attracted position, being held there by combined magnetic effects of the coils 36 and 38 against the opposing effect of the coil 37. The switch elements remain in these positions while the battery is being charged, but when the charging is complete the meter hand 20 touches the contact 21 and the magnet coil 38 is short circuited by wire 40, just as in the modification illustrated in Fig. I, and the armature is then raised by the spring 62, breaking the contacts at 63 and 64, thus disconnecting the battery from the motor-dynamo and stopping the engine.

To sum up, it may be mentioned that the modification of Fig. II differs from that of Fig. I in providing for the excitation of the field of the dynamo electric machine prior to the completion of the armature circuit therethrough. This is of advantage in that it prevents too heavy a current from passing through the armature of the machine when it begins to operate as a motor. This modification also differs from that of Fig. I in that the secondary of the ignition is grounded while the compression relieving mechanism is in operative position. This prevents popping in the engine cylinder.

Terms of the nature of "interrupt" or "interfere with" as applied to the current through coil 38 or to the energization of that coil are broadly used herein as descriptive, not only of an action in which the current is so changed as to gain a substantial effect of cessation, but also of an action in which the current is merely reduced or its effect counteracted.

I am aware that the particular embodiment of my invention above described, and illustrated in the accompanying drawings, is susceptible of considerable variation without departing from the spirit thereof, and therefore I desire to claim my invention broadly, as well as specifically, as indicated by the appended claims.

I claim as my invention:

1. In combination, a gas engine, a dynamo-electric machine, a driving connection between the same, a current source, circuit wires, mechanism for relieving compression in said engine, and a control device having an intermediate inoperative and two extreme operative positions adapted in both of said extreme positions to complete the circuit between said dynamo-electric machine and current source through said circuit wires and to operate said compression relieving mechanism in one of said extreme positions only.

2. In combination, a gas engine, an ignition circuit therefor, a dynamo-electric machine, a driving connection between said machine and engine, a current source, circuit wires, mechanism for relieving compression in said engine, and a control device having an intermediate inoperative and two extreme operative positions adapted in both of said extreme positions to complete the circuit between said dynamo-electric machine and current source through said circuit wires, and also to close said ignition circuit, said control device operating said compression relieving mechanism in one only of said extreme positions.

3. In combination, a gas engine, an ignition circuit therefor, a dynamo-electric machine, a driving connection between said engine and dynamo-electric machine, a current source, circuit wires, mechanism for relieving compression in said engine, and a control device adapted when in one position to accomplish four results, namely, to complete the circuit between said dynamo-electric machine and current source through said circuit wires, to close said ignition circuit, to ground the same and to operate said compression relieving mechanism, and when in another position to accomplish the first two only of said results.

4. In combination, a gas engine, a dynamo-electric machine, a driving connection between the same, a current source, an electromagnet, an armature therefor, an electric circuit including said dynamo-electric machine and current source, said circuit arranged to be completed by the armature in its attracted position, mechanism for relieving compression in said engine, and manual means for moving said armature to its attracted position, and for simultaneously operating said compression relieving mechanism.

5. In combination, a gas engine, a dynamo-electric machine, a driving connection between the same, a current source, an electromagnet, an armature therefor, an electric circuit including said dynamo-electric machine, current source and electro-magnet, said circuit arranged to be completed by the armature when in its attracted position, mechanism for relieving compression in said engine, and manual means for moving said armature to its attracted position, and for simultaneously operating said compression relieving mechanism.

6. In combination, a gas engine, an ignition circuit therefor, a dynamo-electric machine, a driving connection between the engine and dynamo-electric machine, a current source, an electro-magnet, an armature therefor, an electric circuit including said dynamo-electric machine, current source and electro-magnet, said last named circuit and said ignition circuit being arranged to be completed by the armature when in its attracted position, mechanism for relieving compression in said engine, and manual means for moving said armature to its attracted position, and for simultaneously operating said compression relieving mechanism.

7. In combination, a gas engine, a dynamo-electric machine, a driving connection between the same, a current source, an electric circuit including said dynamo-electric machine and current source, an electro-magnetic switch adapted, when electrically actuated, to maintain said circuit closed, means for actuating said electro-magnetic switch, mechanism for relieving compression in said engine, and a common manual means for closing said switch and operating said compression relieving mechanism.

8. In combination, a gas engine, an ignition circuit therefor, a dynamo-electric machine, a driving connection between the engine and dynamo-electric machine, a current source, an electric circuit including said dynamo electric machine and current source, an electro-magnet, an armature therefor constituting a switch adapted, when the electro-magnet is energized, to maintain said last named circuit and said ignition circuit closed, means for energizing said electro-magnet, mechanism for relieving compression in said engine, and a common manual means for moving said armature to close the switch, and for operating said compression relieving mechanism.

9. In combination, a generator, a storage battery, a current meter, an electric circuit including said generator, storage battery and current meter, an electro-magnet, an armature therefor constituting a switch adapted, when the electro-magnet is energized, to maintain said circuit closed, means for energizing said electro-magnet operative only when said circuit is closed, manual means for moving said armature to close the switch and means controlled by said meter for impeding said electro-magnet energizing means.

10. In combination, a gas engine, an ignition circuit therefor, a generator, a driving connection between the engine and generator, a storage battery, a current meter, an electric circuit including said generator, storage battery and current meter, an electro-magnet, an armature therefor constituting a switch adapted, when the electro-magnet is energized, to maintain said last named circuit and said ignition circuit closed, means for energizing said electro-magnet operative when said circuit is closed, manual means for moving said armature to close the switch, and means controlled by said meter for impeding said electro-magnet energizing means.

11. In combination, a generator, a storage battery, a current meter, an electro-magnet having a series and a shunt coil, an electric circuit including said generator, storage battery, current meter, and magnet series coil, an armature for said magnet constituting a switch adapted to maintain said circuit closed when the series and shunt coils are energized, manual means for moving said armature to close the switch, means for energizing said shunt coil, and means controlled by said current meter for interfering with said energizing means.

12. In combination, a generator, a storage battery, a current meter, an electric circuit including said generator, storage battery and current meter, an electro-magnet having three coils, one of which is opposed to the two others, an armature therefor constituting a switch adapted, when all of the coils are energized, to maintain said circuit closed, means for energizing said coils, and means controlled by said meter for interrupting the energizing means as applied to one of the two correspondingly acting coils and increasing the current through the opposing coil.

13. In combination, a generator, a storage battery, a current meter, an electric circuit including said generator, storage battery and current meter, an electro-magnet having three coils, two of which are oppositely wound, and arranged in series, an armature for said magnet constituting a switch adapted, when all of the coils are energized, to maintain said circuit closed, means for energizing said coils, and means controlled by said meter for short circuiting that one of said two coils which is similar in action to the remaining coil whereby the current through the other of said two coils is increased.

14. In combination, a generator, a storage battery, a current meter, an electro-magnet having three coils, a main circuit including said generator, storage battery, current meter, and one of said coils, the two remaining coils being oppositely wound, a circuit including said latter coils in series, said circuit being arranged as a shunt around said dynamo, an armature for said electro-magnet constituting a switch adapted, when all of said coils are energized, to maintain said main circuit closed, and means controlled by said meter for short circuiting that one of said two coils which is similar in effect to said first named coil.

15. In combination, a gas engine, an ignition circuit therefor, a dynamo-electric machine, a driving connection between the gas engine and dynamo-electric machine, a current source, a current meter, an electro-magnet having a series and a shunt coil, an electric circuit including said dynamo-electric machine, current source, current meter and magnet series coil, an armature for said magnet constituting a switch adapted, when both coils of the electro-magnet are energized, to maintain said last named circuit and said ignition circuit closed, manual means for moving said armature to close the switch, means for energizing said shunt coil, and means controlled by said current meter for interrupting said energizing means.

16. In combination, a gas engine, an ignition circuit therefor, a generator, a driving connection between the gas engine and generator, a storage battery, a current meter, an electric circuit including said generator, storage battery and current meter, an electro-magnet having three coils, one of which is opposed to the other two, an armature therefor constituting a switch adapted, when all of the coils are energized, to maintain said last named circuit and said ignition circuit closed, means for energizing said coils, and means controlled by said meter for interrupting the energizing means, as applied to one of the two correspondingly acting coils and increasing the current through the opposing coil.

17. In combination, a gas engine, an ignition circuit therefor, a generator, a driving connection between the generator and gas engine, a storage battery, a current meter, an electric circuit including said generator, storage battery and current meter, an electromagnet having three coils, two of which are oppositely wound and arranged in series, an armature for said magnet constituting a switch adapted, when all of the coils are energized, to maintain said last named circuit and said ignition circuit closed, means for energizing said coils, and means controlled by said meter for short circuiting that one of said two coils, which is similar in action to the remaining coil whereby the current through the other of said two coils is increased.

18. In combination, a gas engine, an ignition circuit therefor, a generator, a driving connection between said generator and gas engine, a storage battery, a current meter, an electro-magnet having three coils, main electric circuit including said generator, storage battery, current meter, and one of said coils, the two remaining coils being oppositely wound, a circuit including said latter coils in series, said circuit being arranged as a shunt around said generator, an armature for said electro-magnet constituting a switch adapted, when all of said coils are energized, to maintain said main and ignition circuits closed, and means controlled by said meter for short circuiting that one of said two coils which is similar in effect to said first named coil.

19. In an electric generating system, a gas engine, a dynamo electric machine, a driving connection between said machine and engine, an accumulator, a switch, an electric circuit including said dynamo-electric machine, accumulator and switch, compression relieving mechanism for said engine, a lever, and mechanical connections between said lever and switch, and between said lever and compression relieving mechanism, said lever having a single inoperative position and two operative positions whereby the switch only is actuated in one of the operative positions and both the switch and the compression relieving mechanism are actuated in the other operative positions.

20. In an electric generating system, a gas engine, an ignition circuit therefor, a dynamo electric machine, a driving connection between said machine and engine, an accumulator, an electric circuit connecting said dynamo electric machine and accumulator, a switch for said circuit and for the ignition circuit, compression relieving mechanism for said engine, a lever having a single inoperative position and a plurality of inoperative positions, and mechanical connections between the lever and switch and between the lever and compression relieving mechanism, said lever being adapted to actuate the switch only in one of its operative positions and to actuate both the switch and compression relief mechanism in another of said operative positions.

21. In an electric generating system, a gas engine, a dynamo-electric machine, a driving connection between said machine and engine, an accumulator, an electric circuit connecting said dynamo-electric machine and accumulator, a switch for said circuit, compression relieving mechanism for said engine, a lever having one intermediate and two extreme positions, and mechanical connections from said lever to the switch, and to the compression relieving mechanism, such that in both of the extreme positions the switch is closed, and in one extreme position only the compression relieving mechanism is operated, while in the intermediate position the switch is not closed by the lever and the compression relieving mechanism is not operated.

22. In an electric generating system, a gas engine, a dynamo-electric machine, a driving connection between said machine and engine, an accumulator, an electric circuit connecting said dynamo-electric machine, and accumulator, a switch for said circuit, an electro-magnet tending to close said switch, energizing means for said electro-magnet, compression relieving mechanism for said engine, a lever having one intermediate and two extreme positions, and mechanical connections from the lever to the switch, and to the compression relieving mechanism, such that in either of the extreme positions the switch is closed, and in one extreme only the compression relieving mechanism is operated, while in the intermediate position the switch is free to be acted upon by the electro-magnet and the compression relieving mechanism is not operated.

23. In combination, a gas engine, a dynamo-electric machine, a shunt field therefor, a driving connection between said machine and engine, a current source, circuit wires, mechanism for relieving compression in said engine, and a control device adapted, when thrown to either of two positions, to first connect said field shunt with said current source and then to complete the circuit between said dynamo-electric machine and current source, and also adapted to operate said compression relieving mechanism when in one of said two positions only.

24. In an electric generating system, a generator, an accumulator, a current meter, an electric circuit joining said generator, accumulator and meter, a switch in said circuit, impelled toward open position, an electro-magnet tending to close said switch, said magnet having a coil of low resistance and two opposed coils of high resistance, means for energizing said coils and means controlled by said meter for interrupting the action of said energizing means in respect to that one of said opposed coils which acts in harmony with said low resistance coil.

25. In an electric generating system, a gas engine, a generator, an accumulator, a current meter, an electric circuit joining said generator, accumulator and meter, a switch in said circuit, impelled toward open position, an electro-magnet tending to close said switch, said magnet having a low resistance coil and two opposed high resistance coils, the two latter coils being arranged in series, means for energizing said coils, and means controlled by said meter for short circuiting that one of said opposed coils which acts in harmony with said low resistance coil, whereby the current in the remaining high resistance coil is somewhat increased.

26. In an electric generating system, a gas engine, a dynamo-electric machine, an accumulator, a current meter, an electric circuit joining said dynamo-electric machine, accumulator and meter, a switch in said circuit, an electro-magnet tending to close said switch, said magnet having a coil of low resistance and two opposed coils of high resistance, means for energizing said coils, and means controlled by said meter for interrupting the action of said energizing means with respect to that one of said opposed coils which acts in harmony with said low resistance coil, and an ignition circuit controlled by said switch.

27. In an electric generating system, a gas engine, a dynamo-electric machine, an accumulator, a current meter, an electric circuit joining the dynamo-electric machine, accumulator and meter, a switch in said circuit, an electro-magnet tending to close said switch, said magnet having a low resistance coil and two opposed high resistance coils, the latter coils being arranged in series, means for energizing said coils, and means controlled by said meter for short circuiting that one of said opposed coils which acts in harmony with said low resistance coil, whereby the current in the remaining high resistance coil is somewhat increased, and an ignition circuit controlled by said switch.

28. In an electrical system, the combination of an internal combustion engine, a dynamo-electric machine operatively connected therewith, a storage battery, an electrical circuit connecting the storage battery to said dynamo-electric machine, an electro-magnetic switch in said circuit, manual means operable to close said switch and momentarily diminish the compression in the engine cylinder, and electrical means operable to open said switch when a predetermined quantity of electricity has passed into said storage battery.

29. In combination, a gas engine and a motor operatively connected, a battery, a series circuit in which said motor and battery are connected, an electro-magnet having one coil connected in said series circuit and a second coil connected in a shunt across said circuit, a switch for said series circuit controlled by said electro-magnet, means tending to open said switch, the magnetic effects of said series and shunt coil being opposed during the discharging of said battery, the coils being so designed that during the heavy discharging at the beginning of the engine starting operation the magnetic effect of the series coil over-balances that of the shunt coil and maintains said switch closed, while as the motor approaches its normal speed this over-balancing effect is lessened and finally overcome by the tendency of the switch to open, whereby the series circuit is broken.

30. In an electric generating system, a gas engine and a motor-generator operatively connected, a storage battery, a series circuit in which said motor-generator and battery are connected, an electro-magnet having one coil connected in said series circuit, a shunt circuit across said series circuit, said magnet having a second coil in said shunt circuit, a switch for said series circuit controlled by said electro-magnet, means tending to open said switch, the magnetic effect of said series and shunt coils being cumulative during the charging of the battery and opposed during discharging, the coils being so proportioned that during the heavy discharge at the beginning of the engine starting operation, the magnetic effect of the series coil over-balances the opposing effect of the shunt coil and maintains the switch closed, while as the motor approaches its normal speed this overbalancing effect is lessened and finally overcome by the tendency of the switch to open, whereby the series circuit will be broken in case the engine fails to start.

31. In an electric generating system, a gas engine and a motor-generator operatively connected, a storage battery, a series circuit in which said motor-generator and battery are electrically connected, an electro-magnet having one coil connected in said series circuit and two opposed coils connected in a shunt across said series circuit, a switch for said series circuit controlled by said electro-magnet, means tending to open said switch, the magnetic effect of said series coil and the difference between the magnetic effects of said shunt coils being cumulative during the charging of the battery and opposed during the discharging, the coils being so designed that during the heavy discharge at the beginning of the engine starting operation, the magnetic effect of the series coil over-balances the opposing effect of the shunt coils and holds the switch closed, while as the motor approaches its normal speed this overbalancing effect is lessened and is finally overcome by the tendency of the switch to open, whereby the series circuit will be broken in case the engine fails to start.

32. In combination, a gas engine, and a dynamo operatively connected, a battery, a series circuit in which said dynamo and battery are electrically connected, an electromagnet having a coil connected in said series circuit, a shunt across said series circuit, said latter circuit including a plurality of magnet coils, a switch for said series circuit controlled by said electro-magnet, means tending to open said switch, the magnetic effect of said series coil and the combined magnetic effects of said shunt coils being cumulative while said battery is being charged by the dynamo, and automatic means for short circuiting the current through part of said shunt coils when the battery has attained a predetermined state of charge.

33. In combination, a gas engine and a dynamo operatively connected, a battery, a series circuit in which said dynamo and battery are electrically connected, an electro-magnet having a coil connected in said series circuit, a shunt across said series circuit, said shunt including a pair of opposed magnet coils, a switch for said series circuit controlled by said electro-magnet, means tending to open said switch, the magnetic effect of said series coil and combined magnetic effect of said shunt coils being cumulative while said battery is being charged by the dynamo, and automatic means, operative when the battery has attained a predetermined state of charge, for short circuiting that one of said shunt coils which is similar in effect to said series coil.

34. In an electric generating system, a gas engine and a motor-generator operatively connected, a storage battery, a series circuit in which said motor-generator and battery are connected, an electro-magnet having a coil connected in said series circuit, a switch for said series circuit controlled by said electro-magnet, means tending to open said switch, a shunt around said motor-generator, a magnet coil connected in said shunt circuit, the magnetic effects of said shunt and series coils being opposed during the discharging of the battery through the motor-generator and cumulative during the charging of the battery by the motor-generator, the coils being so proportioned that the magnetic effect of the series coil over-balances that of the shunt coil while heavy current is passing during the beginning of the starting operation, while as the motor approaches its normal speed the over-balancing effect is lessened and finally overcome by the tendency of the switch to open, whereby the series circuit is broken in case the engine fails to start, and automatic means operative when the battery has attained a predetermined state of charge for diminishing the current through said shunt circuit, whereby the pull of the electro-magnet is overcome by said switch opening means.

35. In an electric generating system, a gas engine and a motor-generator operatively connected, a storage battery, a series circuit in which said motor-generator and battery are connected, an electro-magnet having a coil connected in said series circuit, a circuit shunted around said motor-generator, said electro-magnet having a plurality of coils in said shunt circuit, a switch for said series circuit controlled by said electro-magnet, means tending to open said switch, the magnetic effect of said series coil and combined effects of said shunt coils being opposed during the discharging of the battery through the motor-generator and cumulative during the charging of the battery by the motor-generator, the coils being so proportioned that the magnetic effect of the series coil over-balances that of the shunt coil while the heavy current is passing during the beginning of the engine starting operation, while as the motor approaches its normal speed this over-balancing effect is lessened and is finally overcome by the tendency of the switch to open, whereby the series circuit is broken in case the engine fails to start, and automatic means, operative when the battery has attained a predetermined state of charge, for interfering with the energization of said shunt coils, whereby the pull of the electro-magnet is overcome by said switch opening means.

36. In combination, a gas engine, a dynamo-electric machine, a driving connection between the same, a current source, circuit wires, mechanism for relieving compression in said engine, and a control device having three positions, adapted in one position to operate said compression relieving mechanism and to complete the circuit between said dynamo-electric machine and current source through said circuit wires, and in a second position to complete the said circuit only, and adapted to be moved from the latter position to a third or inoperative position without passing through the first mentioned position.

37. In combination, a gas engine, an ignition circuit therefor, a dynamo-electric machine, a driving connection between said machine and engine, a current source, circuit wires, mehanism for relieving compression in said engine, and a control device having three positions, adapted in the second and third positions to complete the circuit between said dynamo-electric machine and current source through said circuit wires, and also to close said ignition circuit, and in the second position only, to operate said compression relieving mechanism in addition to closing said circuits, said control device being movable from the third position to the first position without passing through the second position.

In testimony whereof, I affix my signature.

CARL P. BROCKWAY.